(12) United States Patent
Provenzale et al.

(10) Patent No.: US 8,045,689 B2
(45) Date of Patent: Oct. 25, 2011

(54) METHOD AND SYSTEM FOR CALL SCREENING

(75) Inventors: Fabrizio Provenzale, Turin (IT); Roberto Pignatta, Turin (IT); Domenico Turco, Turin (IT)

(73) Assignee: Telecom Italia S.p.A., Milan (IT)

( * ) Notice: Subject to any disclaimer, the term of this patent is extended or adjusted under 35 U.S.C. 154(b) by 1057 days.

(21) Appl. No.: 11/885,744

(22) PCT Filed: Mar. 7, 2005

(86) PCT No.: PCT/EP2005/051001
§ 371 (c)(1),
(2), (4) Date: Sep. 6, 2007

(87) PCT Pub. No.: WO2006/094554
PCT Pub. Date: Sep. 14, 2006

(65) Prior Publication Data
US 2008/0165942 A1    Jul. 10, 2008

(51) Int. Cl.
*H04M 3/436* (2006.01)
*H04M 3/533* (2006.01)
*H04M 11/00* (2006.01)

(52) U.S. Cl. .................. 379/196; 379/88.18; 379/88.22; 379/197; 379/199; 379/210.02; 379/210.03

(58) Field of Classification Search .............. 379/88.18, 379/88.22, 188, 196–200, 201.02, 210.03, 379/210.02
See application file for complete search history.

(56) References Cited

U.S. PATENT DOCUMENTS

| | | | |
|---|---|---|---|
| 5,548,636 A | 8/1996 | Bannister et al. | |
| 6,031,896 A | 2/2000 | Gardell et al. | |
| 6,310,939 B1 | 10/2001 | Varney | |
| 6,639,972 B1 | 10/2003 | Cannon et al. | |
| 7,295,660 B1 * | 11/2007 | Higginbotham et al. | 379/196 |
| 2004/0141593 A1 | 7/2004 | Simpson | |
| 2005/0053216 A1 * | 3/2005 | Spencer et al. | 379/211.01 |

FOREIGN PATENT DOCUMENTS
WO   WO 2004/114642 A1   12/2004

OTHER PUBLICATIONS

Donovan, "The SIP INFO Method", Network Working Group, RFC 2976, pp. 1-9, (Oct. 2000).
Rosenberg, et al., "SIP: Session Initiation Protocol", Network Working Group, RFC 3261, pp. 1-269, (Jun. 2002).
Sparks, "The Session Initiation Protocol (SIP) Refer Method", Network Working Group, RFC 3515, pp. 1-23, (Apr. 2003).

\* cited by examiner

*Primary Examiner* — Harry Hong
(74) *Attorney, Agent, or Firm* — Finnegan, Henderson, Farabow, Garrett & Dunner, L.L.P.

(57) ABSTRACT

A method of screening a call from a calling party to a called party, the calling party being connected to a communication network through a first line, the called party being connected to said communication network through a second line, includes sending a notification to a screening terminal which is connected to the communication network through a third line other than the second line when a voice message is being recorded by the calling party in a voice mailbox associated with the called party.

27 Claims, 10 Drawing Sheets

METHOD AND SYSTEM FOR CALL SCREENING

CROSS REFERENCE TO RELATED APPLICATION

This application is a national phase application based on PCT/EP2005/051001, filed Mar. 7, 2005, the content of which is incorporated herein by reference.

BACKGROUND OF THE INVENTION

1. Field of the Invention

The present invention relates to a method and system for screening telephone calls addressed to at least one telephone line. The present invention further relates to a communication network comprising such a system.

2. Description of the Related Art

A centralized telephone answering service, in a telephone network, allows a user to activate a voice mailbox wherein a calling party can record voice messages. In particular, when a calling party calls a called party who has activated the telephone answering service, if the called party does not answer the call (for instance, the called party is engaged, or the called party is inaccessible), the call is forwarded to the voice mailbox of the called party. Usually, the calling party receives a voice announcement informing him that the call is being forwarded to the voice mailbox and inviting him to record a voice message in the voice mailbox. Once recorded, the message is stored into the voice mailbox. The called party is thus able to access his own mailbox and listen to the stored message whenever he wants.

In this scenario, when a calling party calls a called party who has subscribed such a centralized telephone answering service, if the called party does not answer the call, the call is forwarded to a Voice Mail Server. The Voice Mail Server is a centralized remote equipment comprising voice mailboxes of a plurality of users who have subscribed the centralized telephone answering service. The voice message of the calling party is then recorded into the voice mailbox of the called party, which is located in such a Voice Mail Server.

Typically, the called party is notified by the Voice Mail Server that a message was recorded into his voice mailbox. In particular, the user is notified by the Voice Mail Server after the calling party has completed the recording of his voice message. Once notified, the called party can listen to the message by dialing a special telephone number allowing it to access its voice mailbox. Once the called party has listened to the message, it can either listen again to the message, or cancel it, or forward it to another user, or simply keep it stored into the voice mailbox without performing any other action.

However, in many cases, it would be desirable for a user to have the opportunity of listening to a message while a calling party is recording it into his voice mailbox and, possibly, retrieving the call before the calling party ends the recording of the voice message. This service is particularly useful when a user wishes to know the identity of the calling party and the call subject before answering.

U.S. Pat. No. 6,310,939 describes a screening and monitoring capability for switch based voice messaging systems that allows a called party to hear the caller and the caller's voice as the caller leaves a message and break in to start a normal telephone discussion if the caller warrants such an action. U.S. Pat. No. 6,310,939 provides for an advanced intelligent network service feature that controls the bridging of the connections to the voice mail and the called party's telephone station.

U.S. Pat. No. 6,639,972 describes a method for screening active voice mail message that enables real time monitoring by a subscriber to the voice mail system of incoming calls. Once the identity of the subscriber is established, the subscriber is presented with the option of screening an incoming message. A subscriber desiring to screen the message responds by activating a predetermined key or sequence of keys to enter a listen-only mode for monitoring of the incoming message. The subscriber may then interrupt the message and take the call, continue listening to the incoming message, or terminate listen-only mode and simply permit the message to be stored for later retrieval.

U.S. Pat. No. 6,031,896 describes a communication system that provides call connection and voice mail service to telephone devices. With this system, a called party has the ability to monitor and control an incoming voice mail message, made by a calling party, which is to be recorded onto a voice mail system. The system includes a switch that connects the incoming calls to the called party and the voice mail system. A voice mail intercept service terminal receives a message to be recorded on the voice mail system and also selectively connects the incoming call to the called party for a two-way communication.

The above patents describe methods and equipments providing screening services which allow a user to listen, through his own terminal equipment (for example a telephone, a mobile phone or an IP Phone) to messages which are intended for the terminal equipment itself.

In the following description and in the claims, "screening a call" will refer to the ability of a user of:
- being informed that a calling party is recording a voice message;
- optionally listening to at least a portion of the message while it is being recorded in the voice mailbox;
- optionally carrying out actions on the call before the calling party completes the recording of the voice message.

Traditionally, telephone networks are circuit-switched networks, both fixed and mobile. The ensemble of interconnected public circuit-switched fixed telephone networks is referred to as Public Switched Telephone Network or PSTN network. Similarly, the ensemble of interconnected public circuit-switched mobile telephone networks is referred to as Public Land Mobile Network or PLMN network. Typically, a user of a PSTN or PLMN network is provided with a user terminal equipment, which is connected to the network by means of a telephone exchange. More users are connected to the same telephone exchange. PSTN and PLMN networks are further provided with a signalling system; when a calling party makes a call, the signalling system provides telephone exchanges with signalling information, through a suitable signalling protocol. According to signalling information, telephone exchanges configure themselves in order to activate a connection between the calling party and the called party. An example of signalling protocol is the ISDN User Part protocol, or ISUP protocol.

PSTN and PLMN networks are able to support a number of services, such as, for instance, the above mentioned centralized telephone answering service. Presently, providers wishing to create, upgrade and/or modify services provided to their users in a very versatile way, recur to a so called Intelligent Network architecture. It is known that the Intelligent Network architecture is a PSTN/PLMN network architecture allowing to create, upgrade and modify services without substantially modifying telephone exchange hardware/software. The Intelligent Network provides for concentrating service management functions in proper Intelligent Network devices, which are distributed across the network. Such Intelligent Network devices may be either physically separated from the telephone exchanges, or they can be implemented into the telephone exchanges. An Intelligent Network architecture comprises different types of Intelligent Network devices, each type being responsible of carrying out a set of service management operations. Different Intelligent Network devices may communicate e.g. through an Intelligent Network Application Protocol, or INAP protocol.

Recently, telephone services which were traditionally supported by PSTN and PLMN networks may be implemented in packet-switched networks as well. For this purpose, real-time packet transport protocols have been developed, such as the Real-time Transfer Protocol. Besides, signalling protocols have been developed, in order to support a signalling system for telephone traffic in a packet-switched network, such as the Session Initiation Protocol or SIP protocol. For a detailed description of SIP protocol, reference can be made to RFC 3261 "SIP: Session Initiation Protocol" by J. Rosenberg et al., June 2002; to RFC 2976 "The SIP INFO Method", by S. Donovan, October 2000; and to RFC 3515 "The Session Initiation Protocol (SIP)" by R. Sparks, April 2003.

In a packet-switched network supporting telephone services, each user is provided with a suitable user terminal equipment. For instance, users of Voice over IP service, which is supported by IP based packet-switched networks, are provided with an IP Phone. Such an IP Phone is provided with a voice receiver, a voice transmitter and suitable devices for converting voice signal into IP packets and vice versa. Each terminal user equipment is connected to the packet-switched network providing telephone services by means of a proxy server. Different users are connected to a same proxy server. Each proxy server is responsible for managing telephone service requests coming from users connected to the proxy server. In particular, for each request, the proxy server exchanges signalling information by means of the signalling protocol with other devices of the network. According to signalling information, the request is served by allocating the appropriate resources.

SUMMARY OF THE INVENTION

The Applicant has perceived the need to provide the users of a telephone network with a call screening service which is more versatile than the call screening services known in the art.

According to a first aspect, the present invention provides a method of screening a call from a calling party to a called party, the calling party being connected to a communication network through a first line, the called party being connected to the communication network through a second line, the method comprising sending a notification to a screening terminal which is connected to the communication network through a third line other than the second line when a voice message is being recorded by the calling party in a voice mailbox associated with the called party.

Advantageously, the method further comprises sending at least a part of the voice message which is being recorded by the calling party towards the screening terminal.

Preferably, the method further comprises allowing forwarding of the call towards a fourth line after receiving the notification. An identifier of the fourth line is preferably provided by means of the screening terminal.

Preferably, sending the notification comprises including an identifier of the calling party and/or an identifier of the called party in the notification.

Advantageously, two or more lines of the communication network are monitored for call screening, the two or more lines including the second line.

The first line can be connected to a circuit-switched communication network or to a packet-switched communication network. The second line can be connected to a circuit-switched communication network or to a packet-switched communication network. The third line can be connected to a circuit-switched communication network or to a packet-switched communication network. The fourth line can be connected to a circuit-switched communication network or to a packet-switched communication network.

According to a second aspect, the present invention provides a system for screening a call from a calling party to a called party, the calling party being connected to a communication network through a first line, the called party being connected to the communication network through a second line, the system comprising a service resource point, wherein the system further comprises an application server adapted to instructing the service resource point to send a notification to a screening terminal which is connected to the communication network through a third line, other than the second line, when a voice message is being recorded by the calling party in a voice mailbox associated with the called party.

Advantageously, the service resource point is also adapted to send at least a part of the voice message which is being recorded by the calling party towards the screening terminal.

Advantageously, the service resource point is also adapted to receive, from the screening terminal, an identifier of a fourth line towards which the call can be forwarded and to forward the call towards the fourth line.

The fourth line can include either the second line or the third line.

Advantageously, the service resource point is adapted to send the notification including an identifier of the calling party and/or an identifier of the called party.

According to a third aspect, the present invention provides a communication network comprising a system as set forth above.

The network may comprise a circuit switched network associated with intelligent network devices, the intelligent network devices including the service resource point and the application server.

Advantageously, the communication network is adapted to temporarily forward telephone calls to the intelligent network devices through an assist procedure.

The communication network may comprise at least a packet-switched network and, possibly, a proxy server connected to the called party by means of the second line.

The proxy server is adapted to interact with the application server and with the service resource point.

The screening terminal may be connected to the packet-switched network by means of a LAN link, an xDSL link or a dial-up link.

According to an embodiment of the invention, the screening terminal may be either an IP-phone or a personal computer.

BRIEF DESCRIPTION OF THE DRAWINGS

Further features and advantages of the present invention will become clear by the following detailed description, given by way of non limiting example, to be read with reference to the accompanying drawings, wherein.

DETAILED DESCRIPTION OF THE INVENTION

Figure 1:
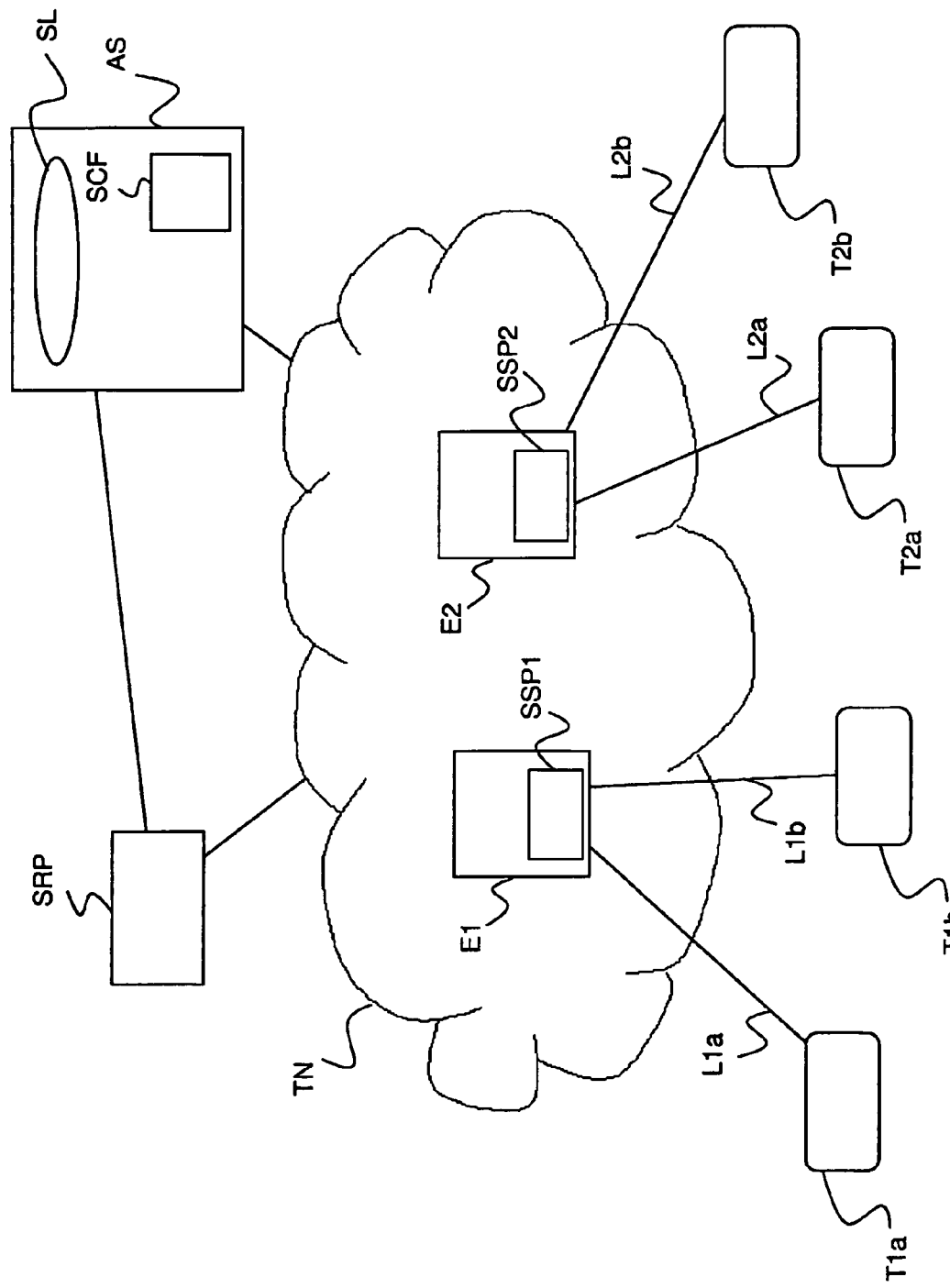
FIG. 1 schematically shows a circuit-switched telephone network.

FIG. 1 shows a circuit-switched telephone network TN with an Intelligent Network architecture.

The circuit-switched telephone network TN may comprise a PSTN network and/or a PLMN network, which are connected one to the others. As already mentioned, a telephone network TN comprises exchanges and user terminal equipments connected to respective user telephone lines. For simplicity, the telephone network TN shown in FIG. 1 comprises only two exchanges E1, E2. Exchange E1 is connected to a plurality of (two in the arrangement of FIG. 1) user terminal equipments T1a, T1b by means of respective user telephone lines L1a, L1b. Similarly, exchange E2 is connected to a plurality of (two in the arrangement of FIG. 1) user terminal equipments T2a, T2b by means of respective user telephone lines L2a, L2b. Moreover, each exchange comprises a first Intelligent Network device, which is termed service switching point. In particular, E1 comprises a service switching point SSP1 and E2 comprises a service switching point SSP2. Such a service switching point allows the user terminal equipments connected to the exchange to access services offered by the service provider. In particular, SSP1 is adapted to forward service activation/deactivation/invocation requests coming from user terminal equipments T1a, T1b to an application server AS. Similarly, SSP2 is adapted to forward service-activation/deactivation/invocation requests coming from user terminal equipments T2a, T2b to the application server AS.

Application server AS is a device which is generally separated from the exchanges. It generally stores a set of software logics SL, each software logic being adapted to provide subscribers with a particular service. Further, application server AS comprises a service control function SCF, i.e. an Intelligent Network function interplaying with the service switching points which executes the software logics SL according to the activation/deactivation/invocation requests coming from the service switching points.

Moreover, the telephone network TN comprises a further Intelligent Network device, which is termed service resource point SRP. The SRP is connected both to the application server AS and to the SSP1, SSP2. The SRP is responsible for providing the users with additional resources which may be necessary to implement particular services. The SRP basically contains a switching matrix to connect users to these additional resources. Examples of additional resources may be courtesy voice messages, customized voice messages, etc.

The telephone network TN comprises other equipments and other Intelligent Network devices that are not shown in FIG. 1 as they are not useful for understanding the present invention.

The present invention provides a method and system for remote screening calls addressed to one or more lines connected to a network, either circuit-switched or packet-switched, supporting telephone services. The term "remote" refers to the fact that call screening is performed by a user through a remote screening terminal, which is connected to a line other than the monitored lines. The term "line" generically refers to a connection by means of which a terminal may be reached. For example, both the monitored line or lines and the remote screening terminal can be reachable by circuit-switched connections identified by different telephone numbers. As another example, the monitored line or lines can be reachable by circuit-switched connections and the remote screening terminal can be reachable by a packet-switched connection (or viceversa). As another example, both the monitored line or lines and the remote screening terminal can be reachable by packet-switched connections through different identifiers (e.g. telephone numbers, Ip addresses, SIP URI etc.). In this context, it is important to notice that the remote screening terminal and the terminals connected to the lines monitored for call screening may be located physically close to each other.

Figure 2:
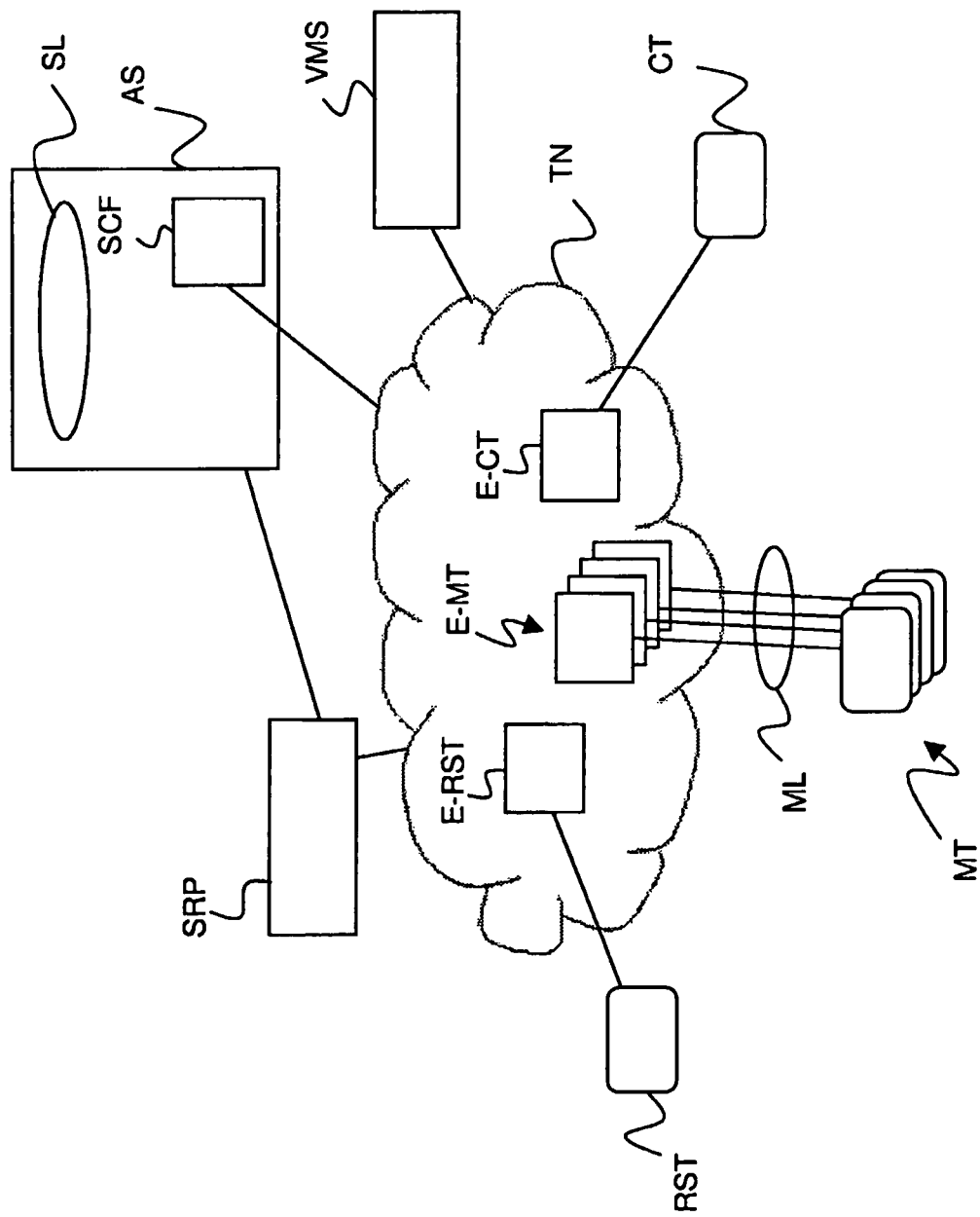
FIG. 2 schematically shows a first embodiment of a system according to the present invention, comprising the telephone network shown in FIG. 1.

FIG. 2 shows a first embodiment of a system for remote call screening according to the present invention, which is implemented into a circuit-switched telephone network. FIG. 2 shows a telephone network TN with an Intelligent Network architecture, whose structure is substantially the one described in FIG. 1. The telephone network TN comprises an application server AS, which includes software logics SL and a service control function SCF. The software logics SL comprise a software program for configuring and/or activating and/or implementing the remote call screening service according to the present invention. Further, the telephone network TN comprises a service resource point SRP. The network TN also comprises a voice mail server VMS.

A remote screening terminal RST is connected to the network TN by means of an exchange E-RST. A calling terminal CT is connected to the network TN by means of an exchange E-CT. One or more monitored terminals MT are connected to the network TN by means of corresponding monitored lines ML and exchanges E-MT. Each exchange E-MT is provided with a service switching point (not shown in FIG. 2), as shown in FIG. 1, enabling interaction with the service control function SCF and service resource point SRP. Whilst in FIG. 2 the E-RST, E-CT and E-MT have been shown as separate devices, they could be the same devices (when, for instance, the calling party is connected to the communication network through the same exchange of the called party).

In this first embodiment of the invention, the remote screening terminal RST may be, for instance, a fixed telephone or a mobile telephone. For instance, the remote screening terminal RST may be a DTMF telephone.

A user may require the application server AS to configure a remote call screening service. In order to configure the service, the user provides the AS with an identifier of the remote screening terminal RST (for example, the telephone number) and with identifiers of one or more telephone lines ML to be monitored for call screening (for example, the respective telephone numbers). Configuration of the remote call screening service according to the invention may be performed, for example, by means of a computer, through which the user accesses a configuration-dedicated web page.

After configuration, the user may activate the remote call screening service as previously configured by means of the remote screening terminal RST, for example by dialling a number or by pressing a key.

The application server AS may perform some coherence and service checks (e.g. the application server AS checks whether the centralized telephone answering service is active for the telephone lines ML).

It is now assumed that a calling party, through the calling terminal CT, calls one of the monitored lines ML. If the called party does not answer (for example, it is not accessible, or the line is busy), the exchange E-MT of the monitored terminal requires the intervention of the application server AS. The application server AS checks whether the remote call screening service is active for the called telephone line.

If the remote call screening service is not active but the centralized telephone answering service is active, the application server AS asks the exchange E-MT of the called telephone line ML to forward the call to the voice mail server VMS.

If the remote call screening service is active, the application server AS asks the exchange E-MT of the called telephone line ML to forward the call to the SRP through an assist procedure. The assist procedure is a well-known procedure which is commonly used in circuit-switched telephone networks provided with an Intelligent Network architecture; such a procedure allows to temporarily forward calls to Intelligent Network devices.

The application server AS also sends to the SRP some pieces of information such as, for example, the identifier of the called line, the identifier of the voice mailbox of the called line, the identifier of the remote screening terminal RST and the type of remote screening terminal RST. The SRP activates a first connection towards the VMS. VMS in turn sends to the calling party a courtesy announcement inviting him to record a voice message in the voice mailbox of the called party. The voice message of the calling party is transmitted, through the SRP, to the VMS, where it is recorded into the voice mailbox of the called line. The SRP further activates a second connection towards the remote screening terminal RST and sends to the remote screening terminal RST a notification message. The notification message informs the user of the remote screening terminal RST that a calling party is recording a voice message into the voice mailbox of one of the monitored lines. The notification message may comprise the identifier of the monitored line and/or, when available, the identifier of the calling party. Optionally, while the SRP is receiving the voice message from the calling party, it may bridge at least part of the voice message to the RST. As the message is being recorded in the VMS, this substantially results in a three-party conference call. Preferably, a one-direction voice channel is established in which the user of the remote screening terminal RST can only listen.

In the present description, the term "to bridge" will be used for indicating a contemporaneous sending of a signal through two connections. For example, with reference to the above mentioned operation of the service resource point, while the SRP is receiving the voice message from the calling party (and it is sending the message to the VMS), it also sends at least part of the voice message to the RST.

According to preferred embodiments of the present invention, the user of the remote screening terminal, once the notification message is received, can perform on the call a number of actions. These actions include:

a) ignoring the notification message and leaving the calling party complete the recording of his voice message, without performing any other action;

b) listening to the voice message that the calling party is recording, without performing any other action;

c) retrieving the call by means of the remote screening terminal;

d) resending the call back to the originally called line;

e) forwarding the call to a further telephone line other than the monitored lines, such a further line being selected by the user.

In order to perform an action, the user of the remote screening terminal sends a request to the SRP. The request may contain an identifier, specified by the user, of the terminal that will receive the retrieved call. According to options c), d) and e), the SRP releases the first connection towards the VMS. The SRP may further send to the calling terminal CT a vocal announcement informing the calling party that the call is being retrieved. The SRP may further send to the remote screening terminal RST a notification message informing the user of the screening terminal that the call is being retrieved. The SRP releases the second connection towards the RST. The SRP notifies to the application server AS that the call is to be retrieved; the SRP also sends to the application server AS the identifier of the terminal that shall receive the retrieved call. The application server asks the exchange E-MT of the called telephone line ML to close the assist procedure, thus releasing the connection towards the SRP, and to activate a connection between the caller terminal CT and the terminal receiving the retrieved call.

It has to be noticed that, thanks to the assist procedure, the remote call screening service according to the present invention is completely managed by the service resource point SRP. In fact, as the application server becomes aware that a monitored telephone line is receiving a call, it instructs the exchange of the monitored line to forward the call to the service resource point, which is adapted to execute all the steps required for treating the call. Thus, the exchanges do not perform any action except forwarding the call to the service resource point. This allows to implement the remote call screening method according to the present invention independently from the type of exchanges comprised into the telephone network. Moreover, this allows to uncouple the remote screening terminal from the terminal receiving the retrieved call, thus allowing the user of the remote screening terminal to select substantially in real-time the terminal for receiving the retrieved call.

Figure 3:
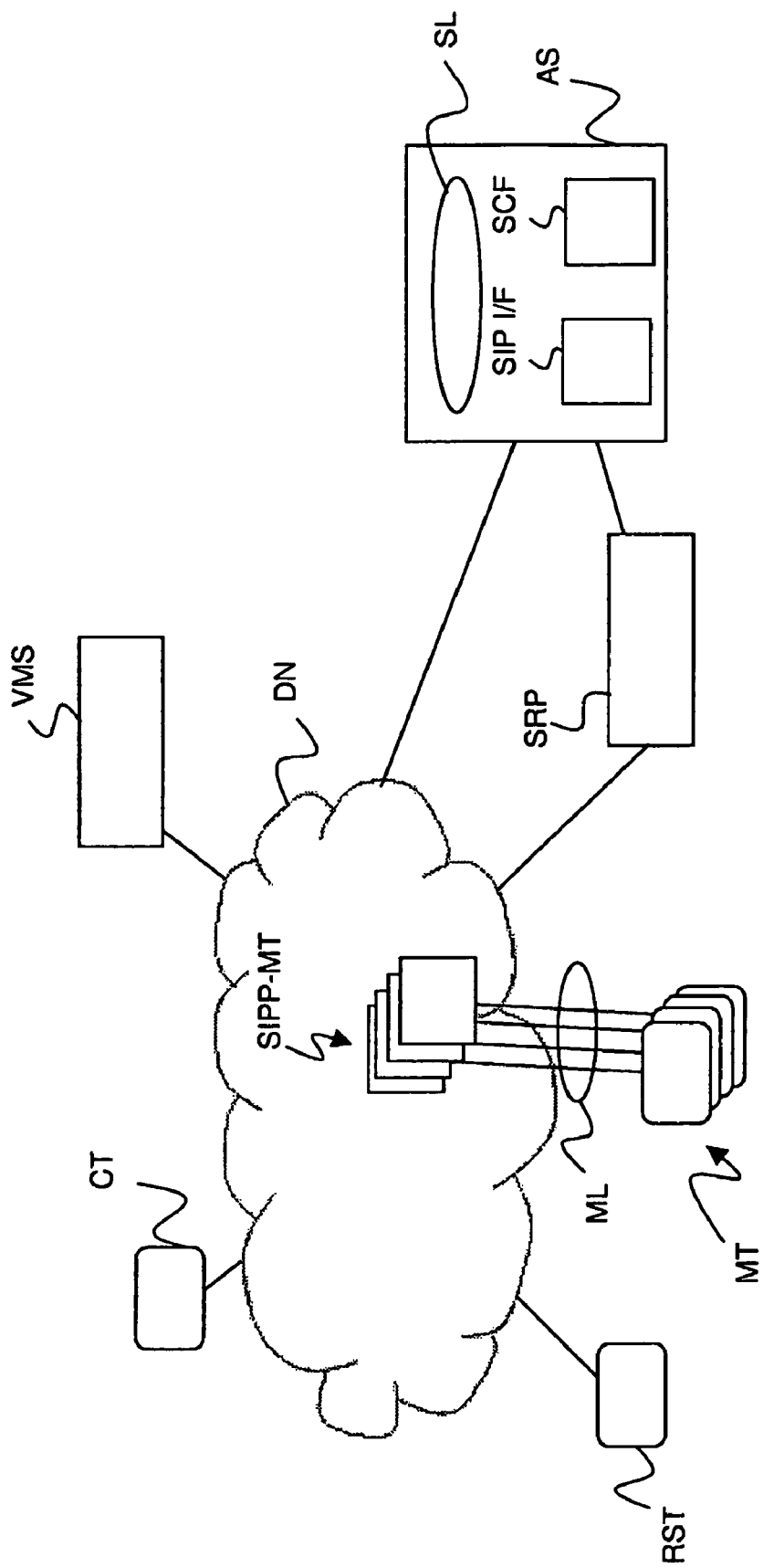
FIG. 3 schematically shows a second embodiment of a system according to the present invention.

The remote call screening service of the present invention can be provided also in a packet-switched network supporting telephone services. FIG. 3 shows a second embodiment of a system for remote call screening according to the present invention, wherein the remote call screening service is implemented into a packet-switched (or data) network DN. The data network DN of FIG. 3 may comprise a single packet-switched data network (for example, an ATM network, an Ethernet network or other), as well as a plurality of data networks connected one to the others.

The data network DN of FIG. 3 is provided with a SIP-based signalling system. Thus, as already mentioned, a user which has subscribed a telephone service supported by the data network DN is connected to the data network DN by means of a SIP proxy server. In particular, a number of monitored terminals MT are connected to the network DN through monitored lines ML, which in turn are connected to respective SIP proxy servers SIPP-MT. Of course, other signalling systems and other types of proxy servers could be provided as well.

The network DN comprises a voice mail server VMS, a service resource point SRP and an application server AS. The application server AS comprises a set of service logics SL for implementing the services supported by the network DN. In particular, SL comprises software programs for configuring and/or activating and/or executing the remote call screening service according to the present invention. The application server AS further comprises a SIP interface SIP I/F allowing the service logics SL to interact with the SIP proxy servers.

In this second embodiment of the invention, the remote screening terminal RST may be, for instance, an IP Phone, or a personal computer executing a software equivalent to the one of an IP phone. The RST is connected to the network DN through a data link, such as for example a LAN, an xDSL or a dial-up link.

Similarly to the first embodiment of the invention, a user of the remote screening terminal first configures the remote call screening service by providing the application server AS with an identifier of the remote screening terminal RST in the data network DN (for example, the SIP URI) and with identifiers in the data network DN of one or more lines ML to be monitored for call screening (for example, the respective SIP URI). Configuration of the server may be performed either by the RST itself, or by a different equipment (e.g. a computer connected to the network DN, allowing the user to access a configuration-dedicated web page).

By means of the remote screening terminal RST, the user asks the application server AS to activate the remote call screening service as previously configured.

The application server AS may perform some coherence and service checks (e.g. the application server AS checks whether a centralized telephone answering service is active for the lines ML).

It is now assumed that a calling party, through its caller terminal CT connected to the data network DN, calls one of the monitored lines ML. If the called party does not answer (for example, it is not accessible, or the line is busy), the SIP proxy server of the monitored terminal SIPP-MT requires the intervention of the application server AS. The application server AS checks whether the remote call screening service is active for the called line.

If the remote call screening service is not active but the centralized telephone answering service is active, the application server AS asks the SIP proxy server SIP-MT of the called line ML to forward the call to the voice mail server VMS. If the remote call screening service is active, the application server AS asks the SIP proxy server SI PP-MT of the called line ML to forward the call to the SRP, e.g. through an "invite" SIP signalling message. Further details about signalling messages will be given herein after with reference to FIG. 9.

The application server AS also sends to the SRP information such as the identifier of the called line, a voice mailbox identifier of the called line, the identifier of the remote screening terminal RST and the type of remote screening terminal. The SRP activates a first connection towards the VMS. VMS in turn sends to the calling party a welcome announcement inviting him to record a voice message in the voice mailbox of the called party. The voice message of the calling party is transmitted, through the SRP, to the VMS, where it is recorded into the voice mailbox of the called party. The SRP activates a second connection towards the remote screening terminal RST and sends to the remote screening terminal RST a notification message. The notification message informs the user of the remote screening terminal RST that a calling party is recording a voice message into the voice mailbox of one of the monitored lines. The notification message may comprise the identifier of the monitored line and/or, when available, the identifier of the calling party. If the terminal RST is an IP Phone, the notification message may be a voice announcement and/or a visual announcement. Similarly, if the terminal RST is a computer, the notification message may be a voice announcement and/or a visual announcement. For instance, the visual announcement could be a window appearing on the screen of the computer (or of the IP Phone) and displaying an identifier of the called monitored line and, when available, an identifier of the calling party. The window could also comprise command lines for entering information for the call retrieving (e.g. identifier of the telephone line to which the retrieved call is to be addressed).

Optionally, if the terminal RST is provided with audio means, while the SRP is receiving the voice message from the calling party, the SRP may also bridge at least part of the voice message to the terminal RST. Preferably, a one-direction voice channel is established in which the user of the remote screening terminal RST can only listen.

As already mentioned, according to the present invention, the user of the remote screening terminal, once the notification message is received, can perform on the call a number of actions. These actions will be briefly recalled herein after:

a) ignoring the notification message and leaving the calling party complete the recording of his voice message, without performing any other action;
b) listening to the voice message that the calling party is recording, without performing any other action;
c) retrieving the call by means of the remote screening terminal;
d) resending the call back to the originally called line;
e) forwarding the call to a further telephone line other than the monitored lines, such a further line being selected by the user.

In order to perform an action, the user of the remote screening terminal RST sends a request to the SRP, for example by means of an "Info" SIP signalling message. According to options c), d) and e), the SRP releases the first connection towards the VMS. The SRP may further send to the calling terminal CT a announcement informing the calling party that the call is being retrieved. The SRP may further send to the remote screening terminal RST an announcement informing the user that the call is being retrieved. This announcement may be either vocal or visual, according to the type of remote screening terminal.

The SRP releases the second connection towards the RST. The SRP, e.g. by means of a "refer" SIP signalling message, asks the calling terminal CT to forward the call to the terminal receiving the retrieved call. Further details about SIP signalling messages for forwarding the call will be given with reference to FIG. 9.

The remote screening terminal and the monitored terminals may be connected to networks of different types. For instance, FIG. 4 shows a third embodiment of a system for remote call screening according to the present invention, wherein the remote screening terminal is connected to a packet-switched network, while the monitored terminals are connected to a circuit-switched network.

Figure 4:
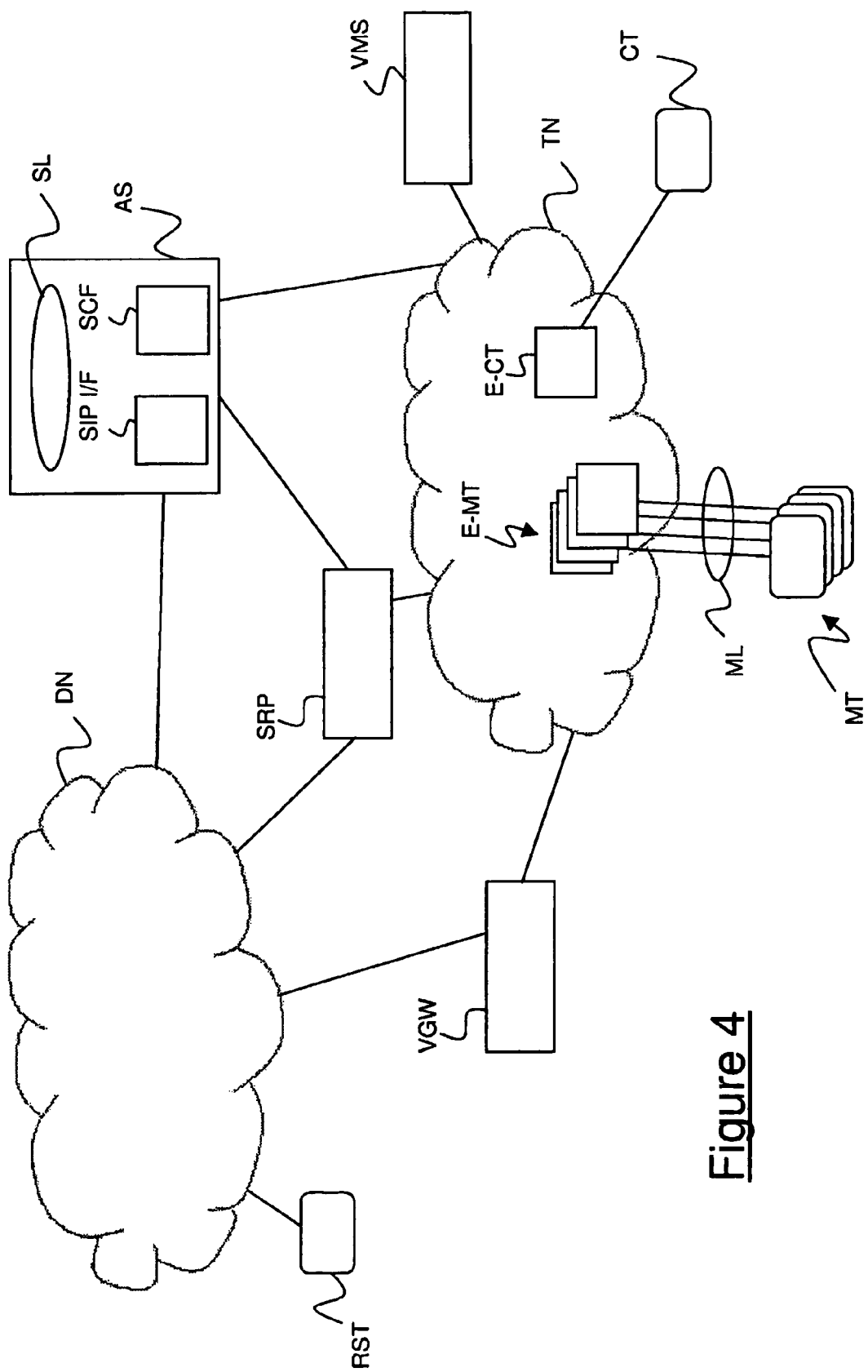
FIG. 4 schematically shows a third embodiment of a system according to the present invention.

FIG. 4 shows a circuit-switched telephone network TN, which may comprise both a PSTN network and a PLMN network connected together. The telephone network TN is connected to a packet-switched data network DN. The two networks are connected together by means of a voice gateway VGW. The voice gateway is adapted to:

perform a conversion between circuit-switched traffic of the telephone network TN and packet-switched traffic of the network DN; and perform a conversion between signalling information of the telephone network TN (e.g. ISUP signalling messages) and signalling information of the data network DN (e.g. SIP signalling messages).

The telephone network TN comprises a voice mail server VMS. a service resource point SRP and an application server AS are both connected to networks TN and DN. The application server AS comprises software logics SL and a service control function SCF. The software logics SL comprise a software program for configuration, activation and execution of the remote call screening service according to the present invention. The service control function allows the service logics SL to interact with the service switching point of the exchanges. The application server further comprises a SIP interface SIP I/F allowing the Service Logics SL to interact with SIP proxy servers.

A remote screening terminal RST is connected to the network DN through a data link, such as LAN, xDSL or dial-up link. One or more monitored terminals MT are connected to the network TN through respective telephone lines ML, which are in turn connected to respective exchanges E-MT. A calling terminal CT is also connected to the network TN by means of an exchange E-CT. Whilst the remote screening terminal RST is shown as connected to a packet switched network DN through a data link other than the telephone lines ML which are monitored for call screening, both the remote screening terminal RST and a monitored terminal MT could be connected to a same physical line connection supporting both packet and circuit traffic. In this case, the user can perform call screening of calls directed to his telephone for example by a computer connected to the packet switched network, e.g. through an ADSL connection, through the same line to which the telephone is connected.

The steps of configuration and activation of the remote call screening according to this third embodiment of the present invention are similar to the ones of the second embodiment of FIG. 3. A detailed, description of these steps can thus be found into the description of FIG. 3.

When the calling terminal CT calls one of the monitored telephone lines ML, if the called party does not answer (for example, it is not accessible, or the line is busy), the exchange E-MT of the monitored terminal requires the intervention of the application server AS. The application server AS checks whether the remote call screening service is active for the called telephone line.

If the remote call screening service is not active but the centralized telephone answering service is active, the application server AS asks the exchange E-MT of the called telephone line ML to forward the call to the voice mail server VMS.

If the remote call screening service is active, the application server AS asks the exchange E-MT of the called telephone line ML to forward the call to the SRP through an assist procedure.

The application server AS also sends the SRP some pieces of information such as, for example, the identifier of the called line, the identifier of the voice mailbox of the called line, the identifier of the remote screening terminal RST and/or the type of remote screening terminal. The SRP activates a first connection towards the VMS. The VMS in turn sends to the calling party a courtesy announcement inviting him to record a voice message in the voice mailbox of the called party. The voice message of the calling party is transmitted, through the SRP, to the VMS, where it is recorded into the voice mailbox of the called line. The SRP further activates a second connection towards the voice gateway VGW, and then to the remote screening terminal RST. Thus, the SRP sends to the remote screening terminal RST a notification message.

According to an embodiment which is not shown in the figures, the voice gateway VGW and the service resource point SRP are integrated into a single apparatus. In this case, the SRP has not to activate a connection towards the voice gateway VGW.

Optionally, while the SRP is receiving the voice message from the calling party, the SRP may also bridge at least part of the voice message to the RST. The voice message bridged to the RST firstly passes through the Voce Gateway VGW, which converts it into packets and transmits the packets to the RST though a real time transfer protocol. As the message is being recorded in the VMS, this substantially results in a three-party conference call. Preferably, a one-direction voice channel is established in which the user of the remote screening terminal RST can only listen.

Also in this third embodiment shown in FIG. 4, the user, after receiving the notification message and, possibly, having listened to a part of the voice message that the calling party is recording, can perform on the call a number of actions These actions will be briefly recalled herein after:
  a) ignoring the notification message and leaving the calling party complete the recording of his voice message, without performing any other action;
  b) listening to the voice message that the calling party is recording, without performing any other action;
  c) retrieving the call by means of the remote screening terminal;
  d) resending the call back to the originally called line;
  e) forwarding the call to a further telephone line other than the monitored lines.

If the user of the remote screening terminal decides to retrieve the call with the remote screening terminal RST, this terminal should be adapted to support a bidirectional real-time communication session (e.g. an IP Phone, or a PC with proper HW and SW). Similarly, if the user decides to forward the call to a line connected to the network DN, the line should be terminated on a user terminal equipment adapted to support, preferably, a bidirectional real-time communication session (e.g. an IP Phone, or a PC with suitable HW and SW).

In order to perform an action, the user of the remote screening terminal sends a request to the SRP, for example by means of an "Info" SIP message. According to options c), d) and e), the SRP releases the first connection towards the VMS. The SRP may further send to the calling terminal CT an announcement informing the calling party that the call is being retrieved. The SRP may further send to the remote screening terminal RST an announcement informing the user that the call is being retrieved. This announcement may be either vocal or visual, according to the type of remote screening terminal.

After releasing both connections towards VMS and RST, the SRP notifies to the application server AS that the call is to be retrieved; the SRP also sends to the application server AS the identifier of the terminal that shall receive the retrieved call. The application server then asks the exchange E-MT of the monitored line ML to close the assist procedure, thus releasing the connection towards the SRP, and activate a connection between the caller terminal CT and the terminal receiving the retrieved call.

Figure 5:
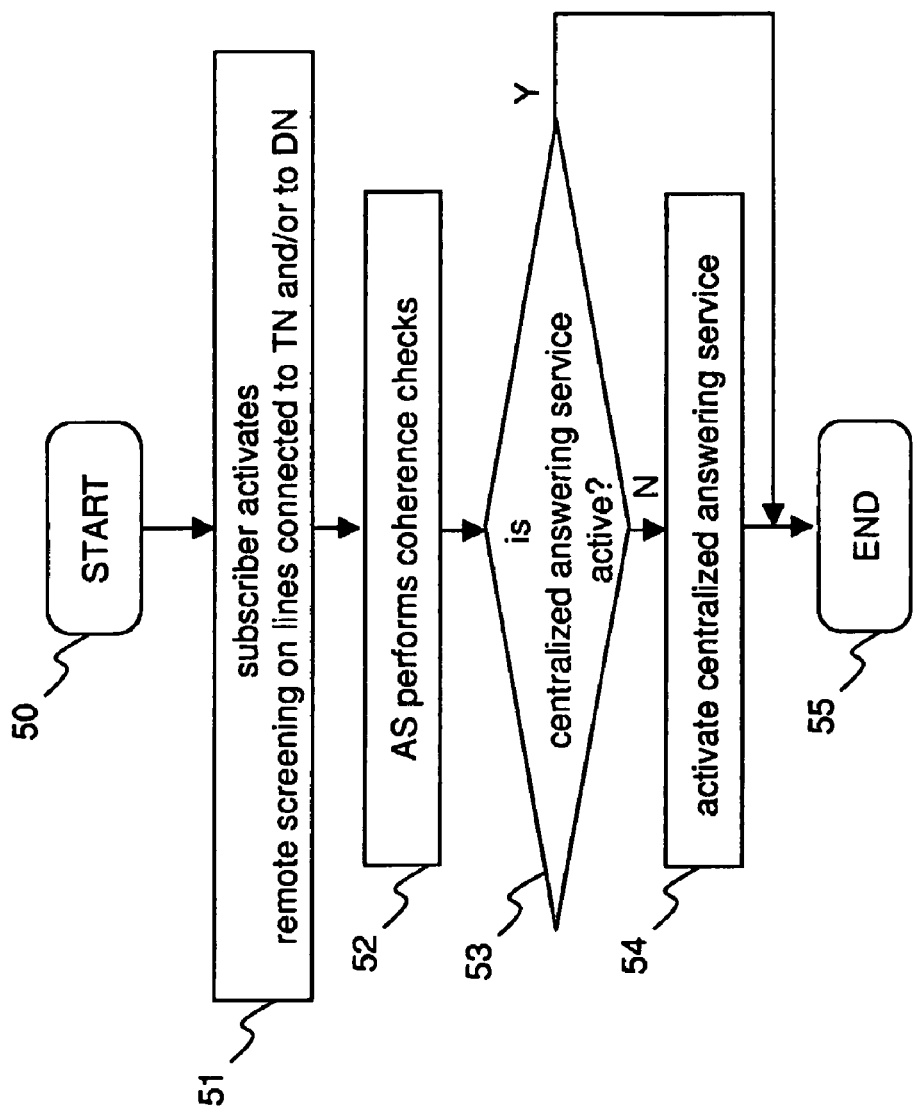
FIG. 5 shows a flow chart of an activation phase of a remote call screening service according to the present invention.

FIG. 5 shows a flow chart of a remote screening service activation phase according to a preferred embodiment of the present invention. The activation starts (step 50) when a user activates his remote screening terminal RST. For example, the user may activate his remote terminal by picking up the receiver or by a similar action. By means of the terminal RST, the user asks the application server AS to activate the remote call screening service for one or more telephone lines (step 51). The identifiers of the remote screening terminal RST and of the monitored lines ML have already been provided to the application server during a configuration step (not shown in FIG. 5), which has been already described by referring to FIGS. 2 and 3. These monitored lines can be connected either to a circuit-switched PSTN network or to a PLMN network or to a packet-switched network. The application server AS may perform some coherence checks (step 52). For instance, the application server AS checks whether the user is authorized to activate call screening on lines indicated by the user. In addition, the application server AS checks (step 53) whether the centralized telephone answering service is active for the lines to be monitored. If not, the application server AS activates the centralized telephone answering service (step 54). The activation of the remote screening service according to the present invention is then completed (step 55).

Figure 6:
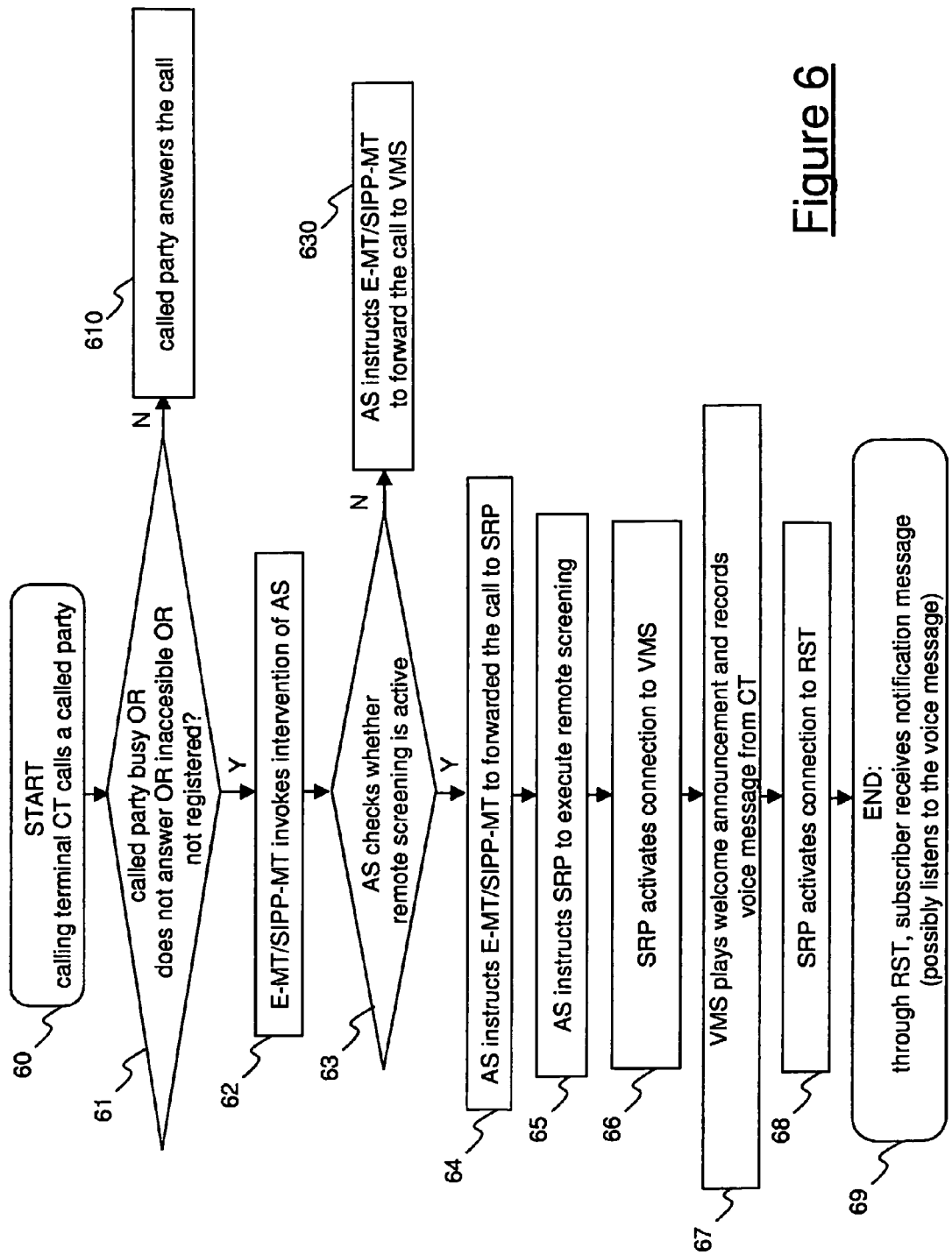
FIG. 6 shows a flow chart of a voice message recording phase and a phase of notification message forwarding to the remote screening terminal according to the present invention.

FIG. 6 shows a flow chart of the phase of recording a voice message and of the phase of forwarding a notification message to a remote screening terminal according to a preferred embodiment of the present invention. A calling terminal CT calls a telephone line (step 60). Such a called line may be connected either to a PSTN or PLMN network or to a packet-switched network. If the called party answers the call (step 610), no further operation is required. On the contrary, if the called party is busy, or it does not answer, or it is inaccessible, or it is not registered, the exchange E-MT or SIP proxy server SIPP-MT through which the called party is connected to the network invokes the intervention of the application server AS (step 62). The application server AS verifies whether the remote screening service is active for the line corresponding to the called party (step 63). If the remote screening service is not active, the application server AS asks the exchange E-MT or SIP proxy server SIPP-MT to forward the call to the voice mail server, so that the calling party can record a voice message in the voice mailbox of the called party (step 630).

On the contrary, if the remote call screening is active, the application server AS instructs the exchange E-MT or SIP proxy server SIPP-MT to forward the call to the service resource point SRP (step 64). Then, the application server AS instructs the service resource point SRP to execute the remote call screening service (step 65). During this step, the AS also forwards to the service resource point SRP some pieces of information, such as the identifier of the called party and/or the identifier of the voice mailbox of the called party and/or the identifier of the remote screening terminal and/or the type of remote screening terminal. Once the call has been received, the SRP activates a connection towards the voice mail server containing the voice mailbox of the called party (step 66). In the meanwhile, the SRP activates a connection towards the remote screening terminal RST (step 66). During this step, the SRP also provides the voice mail server with an identifier of the calling party, as it will be shown in greater detail by referring to FIGS. 8, 9 and 10.

At this point the calling party is connected, through the SRP, to the voice mail server VMS, which sends an announcement inviting the calling party to start recording a voice message into the voice mailbox of the called party. The VMS then starts recording the voice message of the calling party (step 67).

The service resource point SRP sends to the RST a notification message informing the user that the calling party is recording a voice message into the voice mailbox of one of the monitored lines (step 68). During this step, optionally, the SRP may also bridge to the remote screening terminal RST at least a part of the voice message from the calling party, which is in this way transmitted at the same time both to the VMS and to the RST. Possibly, the user is thus able to listen to the voice message as it is being recorded into the voice mailbox of the monitored line. The phase of recording a voice message and of forwarding a notification message to a remote screening terminal is terminated (step 69).

Figure 7:
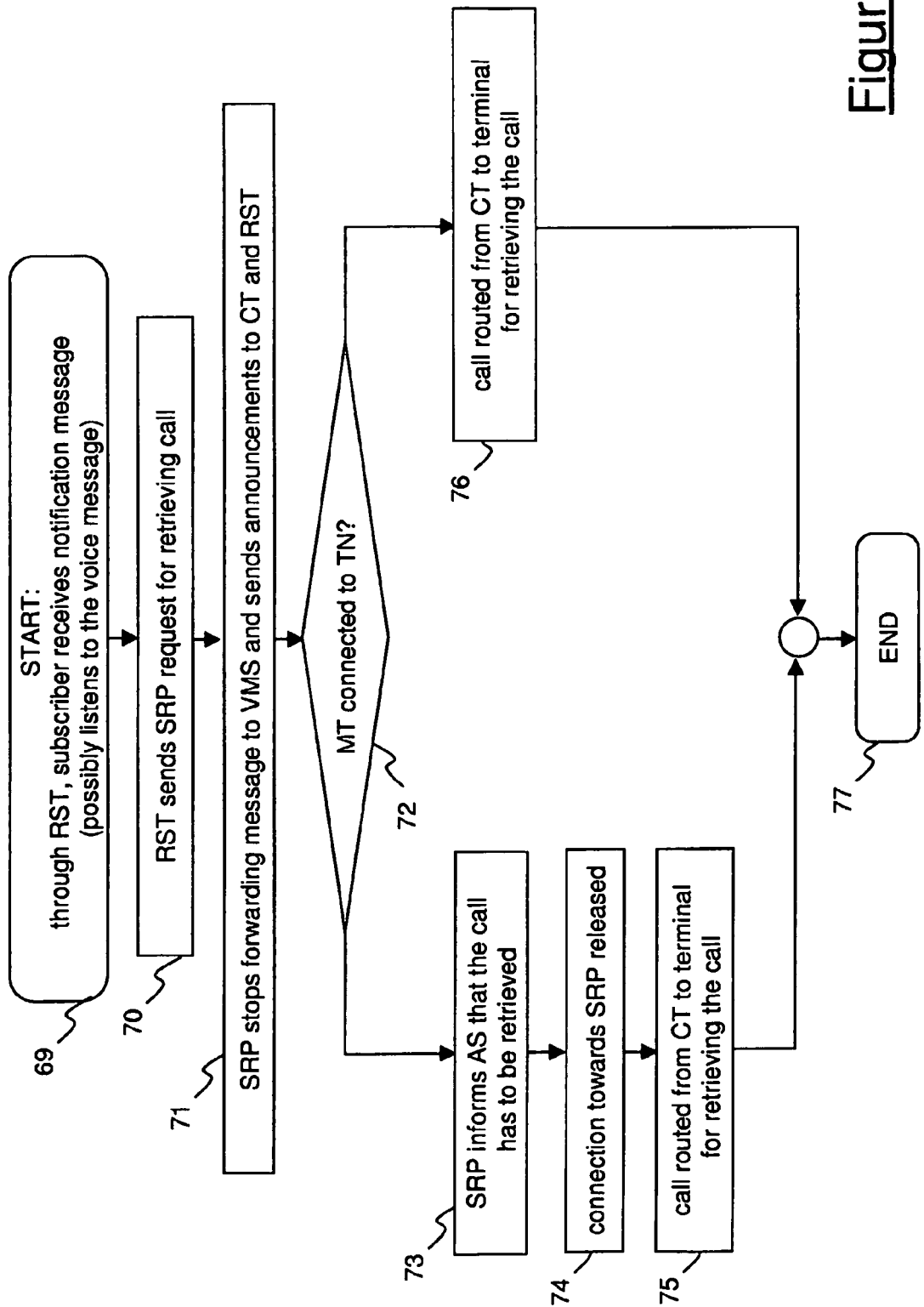
FIG. 7 is a flow chart of a call retrieving phase according to the present invention.

FIG. 7 shows a flow chart of the call retrieving phase when the user of the remote screening terminal retrieves a call according to the present invention.

When a user who has subscribed the remote call screening service has received, by means of his remote screening terminal RST, a notification message informing him that a calling party (terminal CT) is recording a voice message in the voice mailbox of a monitored line (step 68), the user may perform a set of actions on the call, previously indicated as options a), b), c), d), e). If the user wishes to retrieve the call, he sends to the service resource point SRP a request (step 70), possibly containing an identifier of the line or terminal to which the retrieved call should be addressed.

During this step, the user may also require the SRP to cancel the part of voice message already recorded into the voice mailbox of the called party. The procedure by which the user performs this step is not part of the present invention and it will be not described further.

It has to be noticed that the terminal receiving the retrieved call should be adapted to support a bidirectional real-time communication session. This means that the terminal receiving the retrieved call should be provided with a microphone and a receiver. Moreover, if the terminal is connected to a data network, the terminal should also be provided with a processing capacity suitable to perform real-time coding/decoding of packets containing voice traffic.

The SRP releases (step 71) the connection towards the voice mail server and sends to the calling party a voice announcement informing him that the call is going to be retrieved. The SRP sends to the remote screening terminal RST a voice announcement informing the user that the call is being retrieved and the SRP releases the connection towards the RST.

If the called terminal MT is connected to a circuit-switched PSTN or PLMN network, the SRP informs (step 73) the application server AS that the call is to be retrieved. During this step, the SRP also sends to the application server AS the identifier of the terminal that shall receive the retrieved call. The application server instructs the exchange E-MT to release the connection towards the SRP (step 74). The application server AS instructs the exchange E-MT to forward the call to the terminal for receiving the retrieved call (step 75).

Otherwise, if the called party is connected to the packet-switched network, after releasing both connections towards the VMS and RST, the SRP redirects the call to the terminal for receiving the retrieved call (step 76). Details about the signalling messages provided during step 76 will be given herein after by referring to FIG. 9.

It has to be noticed that if the calling party and the terminal receiving the retrieved call are connected to lines of different types (for instance, the calling party is connected to the network PSTN and the terminal receiving the retrieved call is connected to the packet-switched network DN), activation of a connection between the calling party and such a terminal requires the intervention of the voice gateway VGW, which performs the conversion between circuit traffic and packet traffic and the conversion between ISUP signalling messages and SIP signalling messages.

Figure 8:
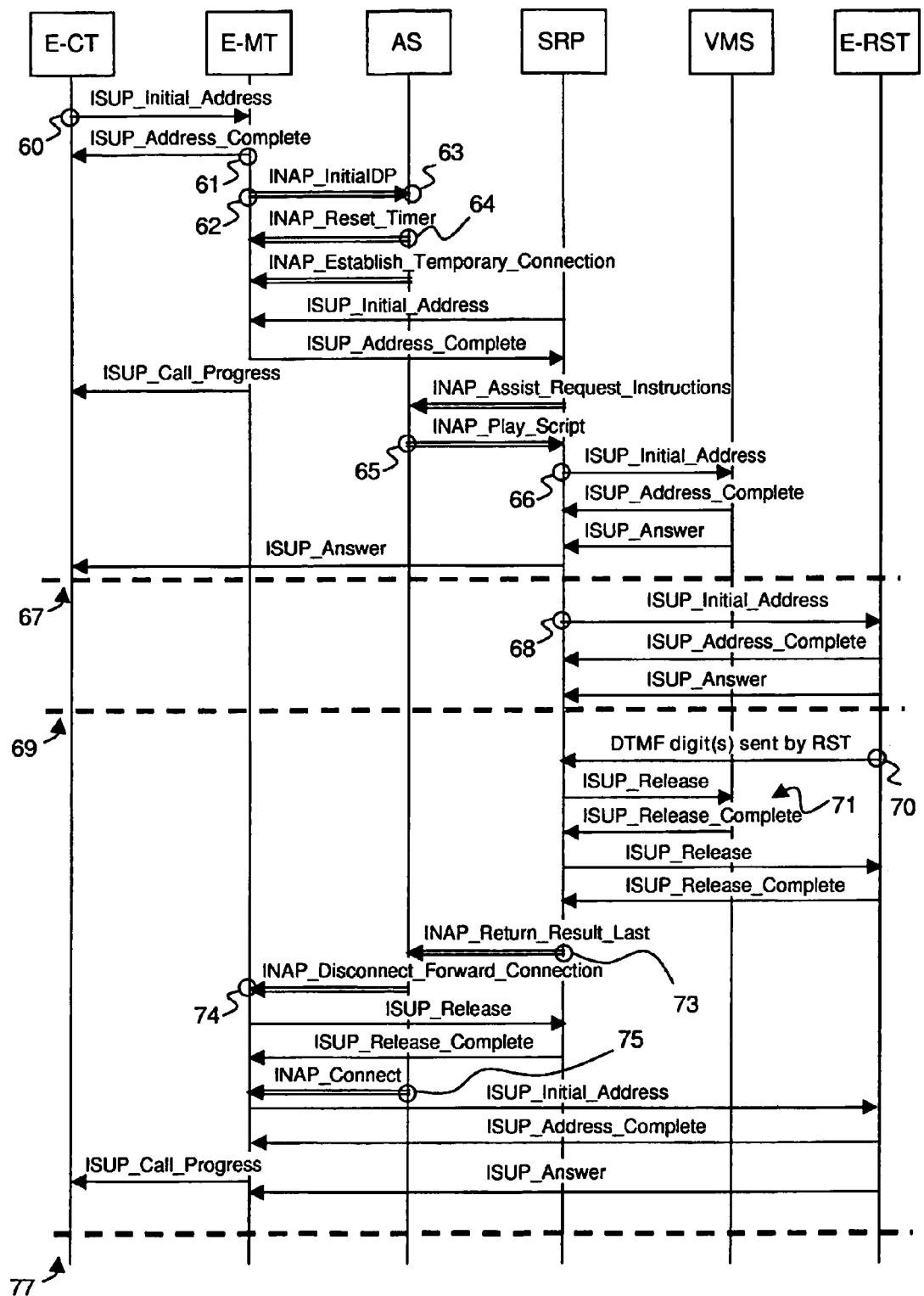
FIG. 8 shows a signalling message diagram for the first embodiment.
Figure 9:
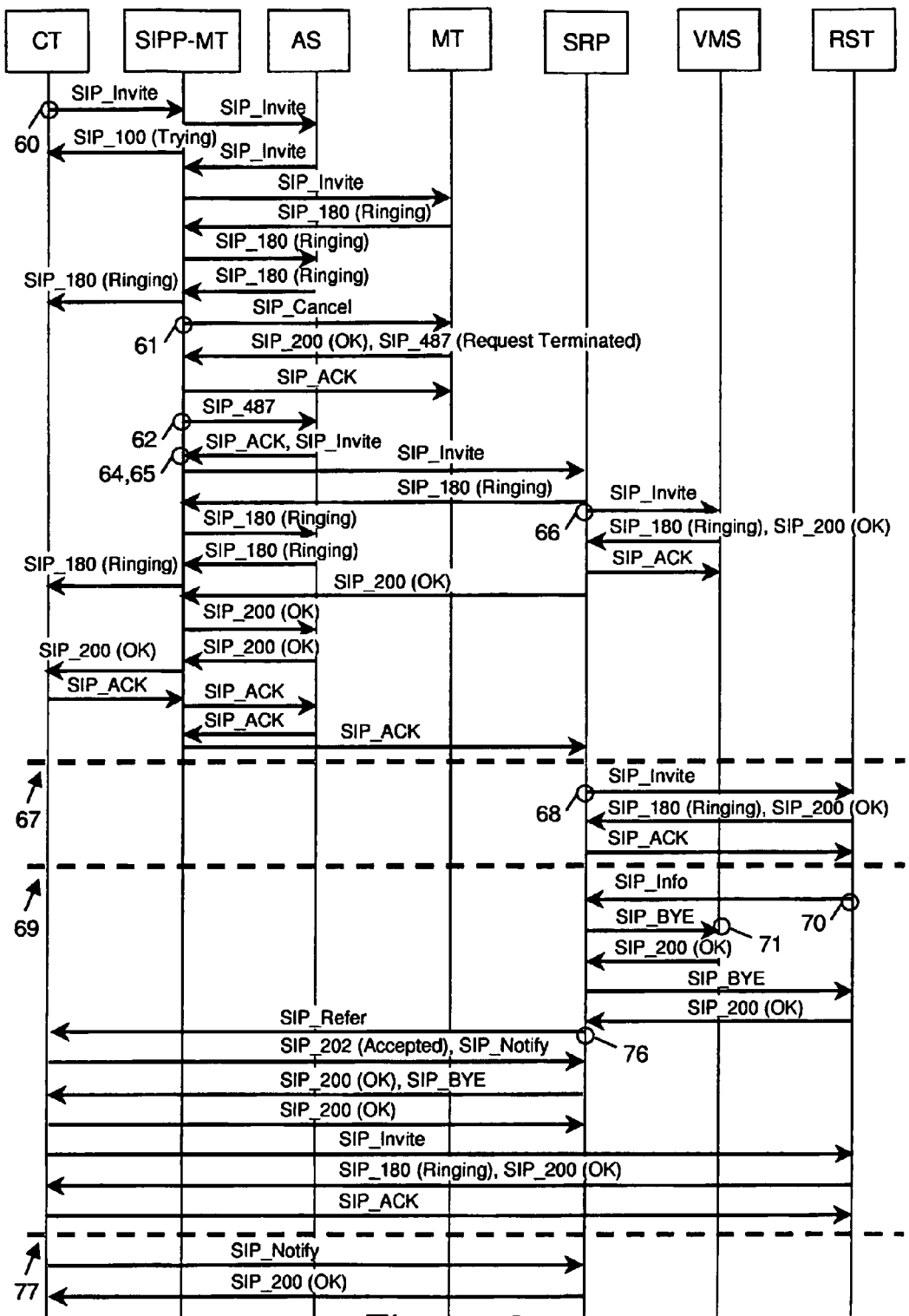
FIG. 9 shows a signalling message diagram for the second embodiment.
Figure 10:
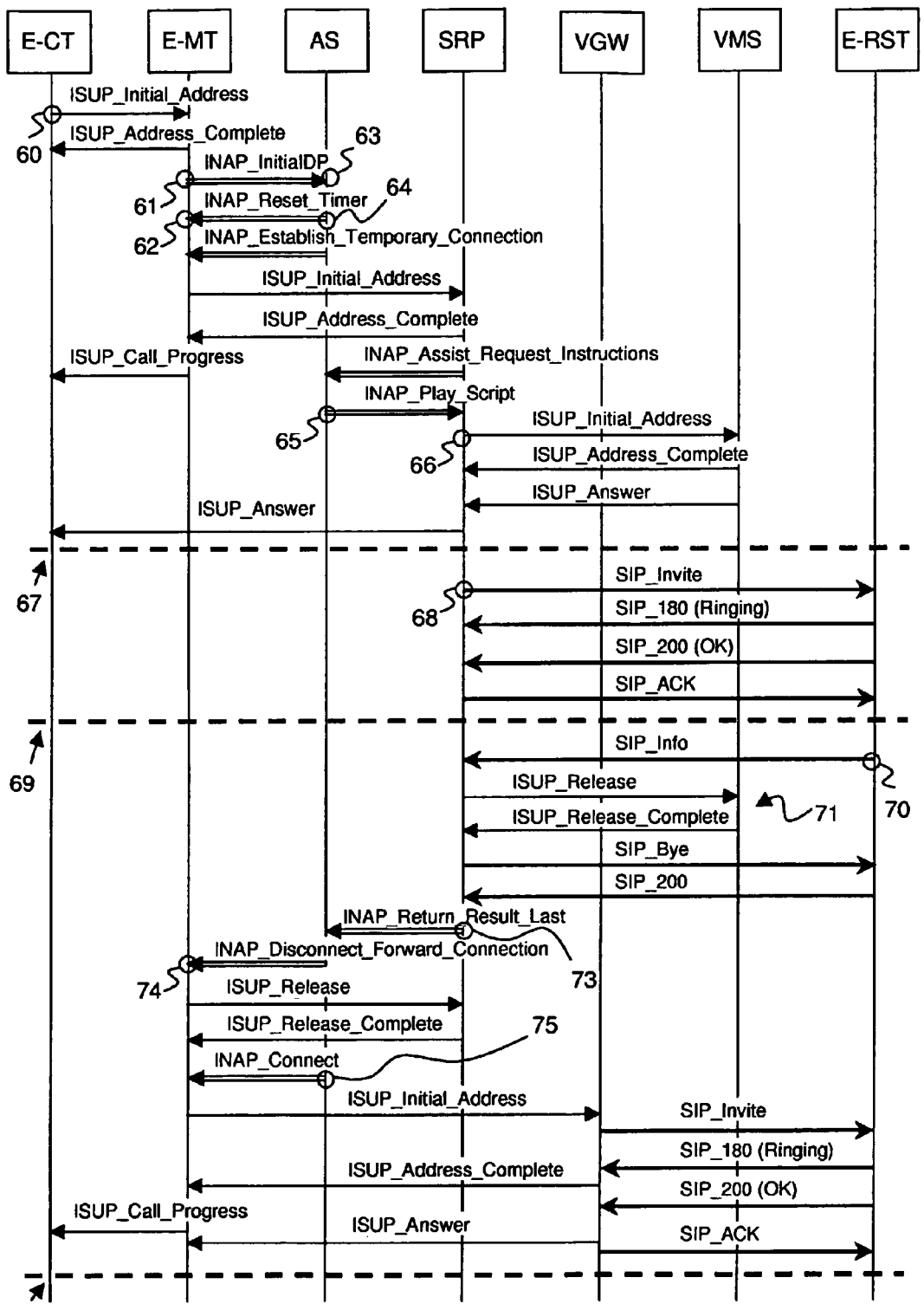
FIG. 10 shows a signalling message diagram for the third embodiment.

FIGS. 8, 9 and 10 are exemplifying signalling message diagrams for implementing the method according to the invention and showing the exchange of various signalling messages. In particular, ISUP signallings are indicated by simple arrows, INAP signallings are indicated by dual line arrows and SIP signallings are indicated by bold line arrows.

FIG. 8 shows an example of signalling message diagram corresponding to the first embodiment of the present invention shown in FIG. 2, wherein both the remote screening terminal and the monitored terminals are connected to a circuit-switched network. The diagram of FIG. 8 relates to the phase of voice message recording and to the phase of notification message forwarded to the remote screening terminal, which are shown in FIG. 6. Further, the diagram of FIG. 8 relates to the call retrieving phase shown in FIG. 7.

In the diagram of FIG. 8, it is assumed that:
- telephone exchanges communicate through ISUP signalling protocol;
- each telephone exchange communicates with the application server (and particularly with the service control function of the application server) through INAP protocol;
- the service resource point and the application server (and particularly the service control function of the application server) also communicate through INAP protocol;
- each telephone exchange communicates with the service resource point through ISUP signalling protocol;
- the voice mail server communicates with the service resource point through ISUP signalling protocol.

Of course, these assumptions are deemed to be a non limiting example. Other embodiments of the present invention may employ different signalling protocols.

As a calling party calls a monitored line ML (step 60), a first signalling session takes places between E-CT and E-MT. In particular, the exchange E-CT sends to the exchange of the monitored line E-MT an "ISUP_Initial_Address" message. The exchange of the monitored line E-MT replies to the exchange E-CT with an "ISUP_Address_Complete" message. If the called party does not answer the call (step 61), the exchange E-MT invokes the intervention of the application server (step 62) by sending to the application server an "INAP-InitialDP" message. The application server replies to the E-MT by sending it a "INAP_Reset_Timer" message. The application server checks whether the remote call screening service is active for the called line (step 63) and asks the exchange E-MT to forward the call to the service resource point by sending to the exchange E-MT an "INAP_Establish_Temporary_Connection" (step 64). The assist procedure starts.

The E-MT, for forwarding the call to the service resource point through the assist procedure, sends to the service resource point an "ISUP_Initial_Address" message. The service resource point replies with an "ISUP_Address_Complete" message. The E-MT then sends to the exchange E-CT of the calling terminal an "ISUP_Call_Progress" message resetting a timer of the "ISUP_Address_Complete" message. The service resource point requests instructions from the application server by sending it an "INAP_Assist_Request Instructions" message. The application server replies (step 65) by sending it an "INAP_Script_Run" message. Such "INAP_Script_Run" message instructs SRP to execute the remote call screening service script and contains the identifier of the called party and/or the identifier of the voice mailbox of the called party into the voice mail server and/or the identifier of the remote screening terminal and/or the type of remote screening terminal.

The service resource point then activates a connection to the voice mail server (step 66). In order to do that, the service resource point sends to the voice mail server an "ISUP_Initial_Address" message. In particular, this "ISUP_Initial_Address" contains a field "Calling Party Number" comprising the identifier of the calling party. The voice mail server accepts the connection by sending an "ISUP_Address_Complete" message to the service resource point. The voice mail server sends an "ISUP_Answer" message to the service resource point. This starts billing of the service. The service resource point sends an "ISUP_Answer" message to the exchange E-CT and connects the calling party to the voice mail server (step 67).

The voice mail server then sends to the calling party a vocal announcement inviting him to record a voice message into the voice mailbox of the called party; then the voice mail server starts recording the voice message.

In the meanwhile, the service resource point activates a connection towards the remote screening terminal RST (step 66). For this purpose, the service resource point sends to the exchange E-RST of the remote screening terminal an "ISUP_Initial_Address" message. The exchange E-RST accepts the connection by replying with an "ISUP_Address_Complete" message and an "ISUP_Answer" message when RST goes off-hook. Then, the service resource point is able to send to the remote screening terminal a notification message.

After listening to the notification message and possibly to a part of the voice message the calling party is recording (step 68), the user sends to the service resource point a request of retrieving the call (step 70). For instance, the user could press a key on his remote screening terminal, or dial a number. Typically this induces the RST to send a number of DTMF digits that are detected by the service resource point.

The service resource point thus releases the connection towards the voice mail server (step 71) by sending to the voice mail server an "ISUP_Release" message. The voice mail server replies with an "ISUP_Release_Complete" message. The service resource point then sends to the calling party and to the user a voice announcement informing both of them that the call is going to be retrieved. Then, the service resource point releases the connection towards the remote screening terminal by sending an "ISUP_Release" message to the exchange E-RST. The exchange E-RST replies with an "ISUP_Release_Complete" message.

Then, the service resource point informs the application server that the call has to be retrieved (step 73) by sending it an "INAP_Script_Event" message. The application server replies with an "INAP_Script_Close" message and the assist procedure is closed. The application server instructs the exchange E-MT to release the connection towards the service resource point (step 74) by means of an "INAP_Disconnect_Forward_Connection" message. The E-MT then releases the connection towards the service resource point by sending it an "ISUP_Release" message. The service resource point replies with an "ISUP_Release_Complete" message.

The application server instructs (step 75) the exchange E-MT to route the call towards the terminal indicated by the user for retrieving the call, by means of an "INAP_Connect" message. The "INAP_Connect" message contains the identifier of the terminal indicated by the user for retrieving the call. For example, the terminal could be the remote screening terminal itself. In this case, the exchange E-MT activates a connection with the exchange E-RST by sending it an "ISUP-Initial_Address" message. The exchange E-RST replies with an "ISUP_Address_Complete". Through an "ISUP_Call_Progress" message sent by the E-MT to the E-CT and an "ISUP_Answer" message sent by the E-RST to the E-MT when RST goes off-hook, a connection between the E-RST and the E-CT is activated. Thus, the calling party is connected to the user (step 77).

FIG. 9 shows an example of signalling message diagram corresponding to the second embodiment of the present invention shown in FIG. 3, wherein both the remote screening terminal and the monitored lines are connected to a packet-switched network. FIG. 9, in particular, shows a scenario wherein the called party does not answer the call of the calling party. The diagram of FIG. 9 relates to the phase of voice message recording and to the phase of notification message sending to the remote screening terminal, which are shown in FIG. 6. Further, the diagram of FIG. 9 relates to the call retrieving phase shown in FIG. 7.

In the diagram shown in FIG. 9, it is assumed that the packet-switched network implements a SIP signalling protocol. Of course, other signalling protocols may be used as well.

As a calling party calls a monitored line ML (step 60), it sends to the SIP proxy server SIPP-MT of the monitored line a "SIP_Invite" message which is sent from SIPP-MT to the application server AS. The SIP proxy server SIPP-MT of the monitored line replies to calling party with a "SIP__100_Trying" message. It has to be noticed that in this second embodiment of the invention the application server is involved for setting up the call between the calling party and the called party. Of course, other ways to trigger an application server in a packed-switched telephone network might be used with regard to international standards currently under definition, without limiting the present invention. In this embodiment the "SIP_Invite" message from CT is sent by the SIPP-MT to the application server, which answers with another "SIP_Invite" message. The SIPP-MT forwards the received "SIP_invite" message to the monitored terminal MT. The terminal MT starts ringing and replies to the SIPP-MT with a "SIP__180 (Ringing)" message. The SIPP-MT forwards the "SIP__180 (Ringing)" message to the application server, which replies with another "SIP__180 (Ringing)" message. This "SIP__180 (Ringing)" message is also forwarded to the calling party. After a predetermined time, if the called party does not answer the call, the SIPP-MT induces the terminal MT to stop ringing by sending a "SIP_Cancel" message. The terminal MT sends an acknowledge through a "SIP__200 (OK)" message and a "SIP__487 (Request terminated)" message. The SIPP-MT acknowledges to the "SIP__487 (Request terminated)" message with a "SIP_ACK" message.

Then, the SIP proxy server SIPP-MT invokes the intervention of the application server (step 62) by forwarding to the application server the "SIP__487" message. The application server answers with a "SIP_ACK" message. Then, the application server checks whether the remote call screen service is active for the called line (step 63) and asks the SIPP-MT to route the call to the service resource point (step 64) by sending a "SIP_invite" message to the service resource point via the SIPP-MT. The "SIP_Invite" message also contains the identifier of the called party and/or the identifier of the voice mailbox of the called party into the voice mail server and/or the identifier of the remote screening terminal and/or the type of remote screening terminal (step 65).

The service resource point replies with a "SIP__180 (Ringing)" message that the SIPP-MT forwards to the application server. The application server replies with another "SIP__180 (Ringing)" message, which is forwarded to the calling party.

At the same time, the service resource point activates a connection to the voice mail server (step 66). In order to do that, the service resource point sends to the voice mail server a "SIP-Invite" message. This "SIP-Invite" in particular contains a field "From" which in turn contains the identifier of the calling party. The voice mail server accepts the connection by sending a "SIP__180 (Ringing)" message and a "SIP__200 (OK) message to the service resource point. Finally, the service resource point sends a "SIP__200 (OK)" message to the application server via the SIPP-MT. After confirmation messages of types "SIP__200 (OK)" and "SIP_ACK" are exchanged among the service resource point, the application server, the SIP proxy server and the calling terminal, the calling party CT is connected, through the SRP, to the voice mail server (step 67).

The voice mail server then sends to the calling party a vocal announcement inviting him to record a voice message into the voice mailbox of the called party; then, the voice mail server starts recording the voice message.

The service resource point activates a connection towards the remote screening terminal RST (step 66). For this purpose, the service resource point sends to the RST a "SIP_Invite" message. The RST answers with a "SIP__180 (Ringing) message and a "SIP__200 (OK)" message. The SRP acknowledges this message by sending a "SIP_ACK" message to the RST, thus a connection is activated between the service resource point and the remote screening terminal. Then, the service resource point is able to send to the remote screening terminal a notification message and, possibly, the voice message as it is being recorded into the voice mailbox of the monitored line (step 68). This resulting in a bridge connection.

To retrieve the call the user sends to the service resource point a request (step 70) through a "SIP_Info" message. For instance, the user could press a key of his remote screening terminal.

The service resource point thus releases the connection to the voice mail server (step 71) by sending to the voice mail server a "SIP_BYE" message. The voice mail server replies with an "SIP__200 (OK)" message. The service resource point then sends to the calling party and to the user a voice announcement informing both of them that the call is going to be retrieved. Then, the service resource point releases the connection towards the remote screening terminal by sending a "SIP_BYE" message to the remote screening terminal. The remote screening terminal replies with a "SIP__200 (OK)" message.

Then, the service resource point, through a "SIP_Refer" message, instructs the calling terminal CT to redirect the call to the terminal indicated by the user for retrieving the call. The calling party CT replies with a "SIP__202 (Accepted)" message and a "SIP_Notify" message. The service resource point replies with a "SIP__200 (OK)" message and releases the connection towards the calling party through a "SIP_BYE" message. The calling party replies with a "SIP__200 (OK)" message and activates a connection to the terminal chosen by the user for retrieving the call. It is assumed that the terminal for retrieving the call is the remote screening terminal itself. The calling party CT sends to the remote screening terminal RST a "SIP_Invite" message in order to activate a connection. The RST replies with a "SIP__180 (Ringing)" message and a "SIP__200 (OK)" message. The calling party CT sends a "SIP_ACK" message. A connection between the RST and the calling party is thus activated, and the calling party is connected to the user (step 77). In the meanwhile, the calling party CT notifies to the service resource point that the connection has been successfully activated though a "SIP_Notify" message. The service resource point answers through a "SIP__200 (OK)" message.

FIG. 10 shows an example of signalling message diagram relating to the third embodiment of the present invention shown in FIG. 4, wherein the remote screening terminal is connected to a packet-switched network, while the monitored lines are connected to a circuit-switched network. The diagram of FIG. 10 relates to the phase of voice message recording and to the phase of notification message sending to the remote screening terminal, which are shown in FIG. 6. Further, the diagram of FIG. 10 relates to the call retrieving phase shown in FIG. 7.

In the diagram shown in FIG. 10, it is assumed that the packet-switched network implements a SIP signalling protocol. Of course, other signalling protocols may be used as well. It is further assumed that:
- telephone exchanges of the telephone network PSTN communicate through the ISUP signalling protocol;
- each telephone exchange communicates with the application server (and particularly with the service control function of the application server) through the INAP protocol;
- the service resource point and the application server (and particularly the service control function of the application server) communicate through the INAP protocol;
- each telephone exchange communicates with the service resource point through the ISUP signalling protocol;
- the voice mail server communicates with the service resource point through the ISUP signalling protocol;
- the remote screening terminal communicates with the service resource point and the voice gateway through the SIP protocol.

Of course, these assumptions are deemed to be a non limiting example. Other embodiments of the present invention may employ different signalling protocols.

As a calling party calls a monitored line ML (step 60), a first signalling session takes places between E-CT and E-MT. In particular, the exchange E-CT sends to the exchange of the monitored line E-MT an "SUP_Initial_Address" message. The exchange of the monitored line E-MT replies to the exchange E-CT with an "ISUP_Address_Complete" message. If the called party does not answer the call (step 61), the exchange E-MT invokes the intervention of the application server (step 62) by sending to the application server an "INAP-InitialDP" message. The application server replies to the E-MT by sending it a "INAP_Reset_Timer" message. The application server checks whether the remote call screening service is active for the called line (step 63) and asks the exchange E-MT to forward the call to the service resource point by sending to the exchange E-MT an "INAP_Establish_Temporary_Connection" (step 64). The assist procedure starts.

The E-MT, for forwarding the call to the service resource point through the assist procedure, sends to the service resource point an "ISUP_Initial_Address" message. The service resource point replies with an "ISUP_Address_Complete" message. The E-MT then sends to the exchange E-CT of the calling terminal an "ISUP_Call_Progress" message resetting a timer of the "ISUP_Address_Complete" message. The service resource point requests instructions from the application server by sending it an "INAP_Assist_Request_instructions" message. The application server replies (step 65) by sending it an "INAP_Script_Run" message. Such "INAP_Script_Run" message instructs SRP to execute the remote call screening service script and contains the identifier of the called party and/or the identifier of the voice mailbox of the called party into the voice mail server and/or the identifier of the remote screening terminal and/or the type of remote screening terminal.

The service resource point then activates a connection to the voice mail server (step 66). In order to do that, the service resource point sends to the voice mail server an "ISUP_Initial_Address" message. In particular, this "ISUP_Initial_Address" contains a field "Calling Party Number" comprising the identifier of the calling party. The voice mail server accepts the connection by sending an "ISUP_Address_Complete" message to the service resource point. The voice mail server sends an "ISUP_Answer" message to the service resource point. This starts billing of the service. The service resource point sends an "ISUP_Answer" message to the exchange E-CT and connects the calling party to the voice mail server (step 67).

The voice mail server then sends to the calling party a vocal announcement inviting him to record a voice message into the voice mailbox of the called party; then the voice mail server starts recording the voice message.

In the meanwhile, the service resource point activates a connection towards the remote screening terminal RST (step 66). For this purpose, the service resource point sends to the RST a "SIP_invite" message. The RST answers with a "SIP_180 (Ringing)" message and a "SIP_200 (OK)" message. Then, after the service resource point has sent a "SIP_ACK" message to the RST, a connection is activated between the service resource point and the remote screening terminal, therefore the service resource point is able to send to the remote screening terminal a notification message.

After listening to the notification message and possibly to a part of the voice message the calling party is recording (step 68), the user sends to the service resource point a request of retrieving the call (step 70) though a "SIP_info" message. For instance, the user could press a key on his remote screening terminal.

The service resource point thus releases the connection towards the voice mail server (step 71) by sending to the voice mail server an "ISUP_Release" message. The voice mail server replies with an "ISUP_Release_Complete" message. The service resource point then sends to the calling party and to the user a voice announcement informing both of them that the call is going to be retrieved. Then, the service resource point releases the connection towards the remote screening terminal by sending a "SIP_BYE" message to the remote screening terminal. The remote screening terminal replies with a "SIP_200 (OK)" message.

Then, the service resource point informs the application server that the call has to be retrieved (step 73) by sending it an "INAP_Script_Event" message. The application server replies with an "INAP_Script_Close" message and the assist procedure is closed. The application server instructs the exchange E-MT to release the connection towards the service resource point (step 74) by means of an "INAP_Disconnect_Forward_Connection" message. The E-MT then releases the connection towards the service resource point by sending it an "ISUP_Release" message. The service resource point replies with an "ISUP_Release_Complete" message.

The application server instructs (step 75) the exchange E-MT to route the call towards the terminal indicated by the user for retrieving the call, by means of an "INAP_Connect" message. The "INAP_Connect" message contains the identifier of the terminal indicated by the user for retrieving the call. For example, the terminal could be the remote screening terminal itself. In this case, the exchange E-MT activates a connection towards the RST by sending an "ISUP_Initial_Address" message to the voice gateway, which sends to the RST a "SIP_Invite" message. The RST starts ringing and replies with a "SIP_180 (Ringing)" message. The voice gateway sends an "ISUP_Address_Complete" message to the exchange E-MT, which sends an "ISUP_Call_Progress" message to the exchange E-CT of the calling party, which hears the audible ringing tone. When the user answer, the RST sends to the Voice Gateway a "SIP_200 (OK)" message, and the voice gateway sends to the E-MT an "ISUP_Answer" message. The voice gateway sends to the RST a "SIP_ACK"

message and a connection between the E-MT and RST is activated through the voice gateway. Thus, the calling party is connected to the user (step 77).

The invention claimed is:

1. A method of screening a call from a calling terminal to a called terminal, the calling terminal being connected to a communication network through a first line and the called terminal being connected to said communication network through a second line, comprising:
sending an instruction, using an application server, to an intelligent network device to send a notification to a screening terminal which is connected to said communication network through a third line other than the second line when a voice message is being recorded by the calling terminal in a voice mailbox associated with the called terminal.

2. The method according to claim 1, further comprising sending at least a part of said voice message which is being recorded by said calling terminal, toward said screening terminal.

3. The method according to claim 1, further comprising allowing forwarding of said call toward a fourth line after receiving said notification.

4. The method according to claim 3, wherein an identifier of said fourth line is provided by means of said screening terminal.

5. The method according to claim 3, wherein forwarding of said call toward a fourth line comprises forwarding of said call toward either said second line or said third line.

6. The method according to claim 1, wherein sending said notification comprises including an identifier of the calling terminal and/or an identifier of the called terminal in said notification.

7. The method according to claim 1, further comprising monitoring for call screening two or more lines of said communication network, the two or more lines comprising said second line.

8. The method according to claim 1, wherein said first line is connected to a circuit-switched communication network or to a packet-switched communication network.

9. The method according to claim 1, wherein said second line is connected to a circuit-switched communication network or to a packet-switched communication network.

10. The method according to claim 1, wherein said third line is connected to a circuit-switched communication network or to a packet-switched communication network.

11. The method according to claim 3, wherein said fourth line is connected to a circuit-switched communication network or to a packet-switched communication network.

12. A system for screening a call from a calling terminal to a called terminal, the calling terminal being connected to a communication network through a first line and the called terminal being connected to said communication network through a second line, comprising:
a service resource point; and
an application server adapted to instruct said service resource point to send a notification to a screening terminal which is connected to said communication network through a third line, other than said second line, when a voice message is being recorded by the calling terminal in a voice mailbox associated with said called terminal.

13. The system according to claim 12, wherein said service resource point is also adapted to send at least a part of said voice message which is being recorded by said calling terminal, toward said screening terminal.

14. The system according to claim 12, wherein said service resource point is also adapted to receive, from said screening terminal, an identifier of a fourth line toward which said call can be forwarded.

15. The system according to claim 14, wherein said service resource point is also adapted to forward said call toward said fourth line.

16. The system according to claim 15, wherein said fourth line comprises either said second line or said third line.

17. The system according to claim 12, wherein said service resource point is adapted to send said notification comprising an identifier of the calling terminal and/or an identifier of the called party called terminal.

18. A communication network comprising a system according to claim 12.

19. The communication network according to claim 18, wherein said communication network comprises a circuit switched network associated with intelligent network devices, said intelligent network devices comprising said service resource point and said application server.

20. The communication network according to claim 19, wherein said communication network is adapted to temporarily forward telephone calls to said intelligent network devices through an assist procedure.

21. The communication network according to claim 18, wherein the communication network comprises at least a packet-switched network.

22. The communication network according to claim 21, further comprising a proxy server connected to said called terminal by means of said second line.

23. The communication network according to claim 22, wherein said proxy server is adapted to interact with said application server and with said service resource point.

24. The communication network according to claim 21, wherein said screening terminal is connected to said packet-switched network by means of a LAN link, an xDSL link or a dial-up link.

25. The communication network according to claim 21, wherein said screening terminal is either an IP-phone or a personal computer.

26. The method according to claim 1, wherein the called terminal is connected to an exchange device of said communication network through said second line, wherein said communication network comprises a voice mail server comprising said voice mailbox associated with said called terminal, wherein the method comprises, before sending said instruction to said intelligent network device:
a) at said exchange device, creating a connection towards said intelligent network device and forwarding said call to said intelligent network device;
b) at said intelligent network device, creating a first further connection towards said voice mail server;
c) at said intelligent network device, creating a second further connection towards said screening terminal;
and wherein said method further comprises, after sending said notification to said screening terminal:
d) at said intelligent network device, releasing said first further connection and said second further connection;
e) at said exchange device, releasing the connection towards said intelligent network device; and
f) at said exchange device, creating a third further connection towards one of said screening terminal and a further terminal for retrieving said call.

27. The system according to claim 12, wherein the called terminal is connected at an exchange device of said communication network through said second line, wherein the system further comprises a voice mail server comprising said voice mailbox associated with said called terminal, wherein said application server is adapted to, before instructing said service resource point to send said notification:

instruct said exchange device to create a connection towards said service resource point and to forward said call to said service resource point;

instruct said service resource point to create a first further connection towards said voice mail server; and instruct said service resource point to create a second further connection towards said screening terminal;

wherein said application server is further adapted to, after said service resource point sent said notification to said screening terminal:

instruct said service resource point to release said first further connection and said second further connection;

instruct said exchange device to release the connection towards said service resource point; and instruct said exchange device to create a third further connection towards one of said screening terminal and a further terminal for retrieving said call.

* * * * *